United States Patent
Hamada et al.

(10) Patent No.: US 9,118,049 B2
(45) Date of Patent: Aug. 25, 2015

(54) FUEL CELL SYSTEM

(75) Inventors: Hitoshi Hamada, Gotemba (JP); Hideki Kubo, Seto (JP); Hironori Noto, Tokai (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 1007 days.

(21) Appl. No.: 12/447,714

(22) PCT Filed: May 26, 2008

(86) PCT No.: PCT/JP2008/060095
§ 371 (c)(1),
(2), (4) Date: Apr. 29, 2009

(87) PCT Pub. No.: WO2008/146928
PCT Pub. Date: Dec. 4, 2008

(65) Prior Publication Data
US 2010/0068576 A1 Mar. 18, 2010

(30) Foreign Application Priority Data
May 29, 2007 (JP) .................... 2007-142424

(51) Int. Cl.
*H01M 8/04* (2006.01)
(52) U.S. Cl.
CPC .......... *H01M 8/0488* (2013.01); *H01M 8/0491* (2013.01); *H01M 8/04559* (2013.01); *H01M 8/04589* (2013.01); *H01M 8/04753* (2013.01); *H01M 8/04955* (2013.01); *H01M 8/04992* (2013.01); *Y02E 60/50* (2013.01)
(58) Field of Classification Search
CPC ........................... Y02E 60/50; H01M 8/04559
USPC ........................................................ 429/432
See application file for complete search history.

(56) References Cited

U.S. PATENT DOCUMENTS

| 5,929,594 A | 7/1999 | Nonobe et al. | |
|---|---|---|---|
| 2006/0141305 A1* | 6/2006 | Kazama | 429/23 |
| 2007/0026273 A1* | 2/2007 | Okamoto | 429/22 |

FOREIGN PATENT DOCUMENTS

| DE | 10 2006 050 182 A1 | 4/2008 | |
|---|---|---|---|
| DE | 11 2007 002 792 T5 | 10/2009 | |
| JP | 59-149668 A | 8/1984 | |
| JP | H07-001700 B | 1/1995 | |
| JP | H07-063020 B | 7/1995 | |
| JP | H07-183039 A | 7/1995 | |
| JP | 07272736 | * 10/1995 | H01M 8/04 |
| JP | H10-074533 A | 3/1998 | |
| JP | 2002-164068 A | 6/2002 | |
| JP | 2003-346849 A | 12/2003 | |
| JP | 2004-178998 A | 6/2004 | |
| JP | 2005-251396 A | 9/2005 | |
| JP | 2005-339848 A | 12/2005 | |
| JP | 2006-049259 A | 2/2006 | |
| JP | 2006-073501 A | 3/2006 | |
| JP | 2006-147178 A | 6/2006 | |
| JP | 2007-095588 A | 4/2007 | |

* cited by examiner

*Primary Examiner* — Ula C Ruddock
*Assistant Examiner* — Archer Dudley
(74) *Attorney, Agent, or Firm* — Kenyon & Kenyon LLP (57) ABSTRACT

A fuel cell system determines whether an operation condition of a fuel cell corresponds to a fuel gas shortage or an oxidation gas shortage. Upon determining that the fuel gas is in shortage, the system sets a lower voltage limit to be higher than that set when the system determines that the oxidation gas is in shortage. The system further controls an output voltage from the fuel cell so as to prevent output voltage from the fuel cell from decreasing below the lower voltage limit.

13 Claims, 8 Drawing Sheets

FUEL CELL SYSTEM

This is a 371 national phase application of PCT/JP2008/060095 filed 26 May 2008, which claims priority to Japanese Patent Application No. 2007-142424 filed 29 May 2007, the contents of which are incorporated herein by reference.

TECHNICAL FIELD

The present invention relates to a fuel cell system including a fuel cell that receives a supply of a fuel gas and an oxidation gas to generate power.

BACKGROUND ART

A fuel cell stack has a stack structure with a plurality of cells stacked in series. Each of the cells includes a membrane-electrode assembly with an anode located on one surface of an electrolytic membrane and a cathode located on the other surface thereof. Supplying a fuel gas and an oxidation gas to the membrane-electrode assembly induces an elecrtrochemical reaction. Thus, chemical energy is converted into electric energy. In particular, a solid polyelectrolyte fuel stack using a solid polymer film as an electrolyte requires reduced costs, is easy to make compact, and offers a high power density. The solid polyelectrolyte fuel stack is thus expected to be used as a vehicle-mounted power source.

To operate a fuel cell system, moisture inside the fuel cell stack and the temperature of the interior thereof need to be closely managed to detect a power generation error such as a shortage of a supply of a reaction gas caused by flooding or an increase in resistance caused by the dried electrolytic membrane. Thus, the power generation condition of the cells needs to be managed so as to provide sufficient power. Japanese Patent Publication No. 7-63020 refers to a scheme of controlling operation so as to prevent an electrode potential from increasing above an upper voltage limit while preventing a cell voltage from decreasing below a lower voltage limit (the electrode potential refers to the potential of each of the anode and the cathode, and the cell voltage refers to the potential of the cathode with reference to the anode). When the fuel cell stack continues to be operated at a high potential at which the electrode potential is in an oxidation region, a catalyst may be ionized and eluted. Thus, the upper voltage limit is specified so as to prevent the electrode potential from increasing enough to degrade the catalyst. Furthermore, when power generation is continued with some of the cells offering a reverse potential (in this phenomenon, the anode potential is higher than the cathode potential), the catalyst degradation or the like may occur to deteriorate power generation performance. Thus, the lower voltage limit is specified so as to prevent the possible reverse potential.

[Patent Document 1] Japanese Patent Publication No. 7-63020

DISCLOSURE OF THE INVENTION

However, with the conventional operation scheme, since the lower voltage limit has a predetermined fixed value, a tolerable range of power generation cannot be flexibly changed depending on a cell voltage reduction factor. Disadvantageously, the tolerable range of power generation is fixed.

Furthermore, if a fuel cell stack made up of a plurality of cells stacked in series is operated, completely equalizing the power generation performance and conditions of all the cells is difficult. When operation conditions are degraded owing to a decrease in proton conductivity caused by a dry-up phenomenon, the shortage of the supply of the reaction gas, or the like, the cell voltage decreases in cells with low power generation performance or in improper conditions. Among the cell voltage reduction factors, a shortage of the fuel gas may electrochemically damage the fuel cell stack. When the cell voltage reduction factor is a shortage of the oxidation gas, the fuel cell stack is prevented from being electrochemically damaged.

However, with the conventional scheme, determining whether the cell voltage reduction factor is the fuel gas shortage or the oxidation gas shortage is difficult. Thus, when a decrease in cell voltage is detected, output is equally limited even if the cell voltage reduction factor is the oxidation gas shortage. As a result, drivability may be degraded.

Thus, an object of the present invention is to provide a fuel cell system which can solve the above-described problems and flexibly change the tolerable range of power generation depending on the operation conditions. Another object of the present invention is to provide a fuel cell system that can determine whether the cell voltage reduction factor is the fuel gas shortage or the oxidation gas shortage to properly manage the cell voltage according to the cell voltage reduction factor.

To accomplish these objects, a fuel cell system according to the present invention comprises a fuel cell which receives a supply of a fuel gas and an oxidation gas to generate power, a determination device which determines whether or not an operation condition of the fuel cell corresponds to a fuel gas shortage or an oxidation gas shortage, a lower voltage limit setting device which, when the determination device determines that the fuel gas is in shortage, sets a lower voltage limit to be higher than that set when the determination device determines that the oxidation gas is in shortage, and a control device which controls an output voltage from the fuel cell so as to prevent the output voltage from decreasing below the lower voltage limit set by the lower voltage limit setting device.

If the cell voltage reduction factor is the fuel gas shortage, continuous power generation with the cell offering a reverse potential may severely damage the cell. Thus, the lower voltage limit is preferably set to be higher to strictly limit the decrease in cell voltage so as to prevent the possible reverse potential. On the other hand, if the cell voltage reduction factor is the oxidation gas shortage, the continuous power generation with the cell offering the reverse potential less severely damages the cell than when the fuel gas is in shortage. Thus, to allow the reverse potential to be generated, the lower voltage limit for the oxidation gas shortage is preferably set to be lower than that for the fuel gas shortage to relatively ease the limitation on the decrease in cell voltage.

A fuel cell system based on another aspect of the present invention comprises a fuel cell which receives a supply of a fuel gas and an oxidation gas to generate power, a lower voltage limit setting device which sets a lower voltage limit for a low-efficiency operation to be lower than that for a normal operation, and a control device that controls an output voltage from the fuel cell so as to prevent the output voltage from decreasing below the lower voltage limit set by the lower voltage limit setting device.

A decrease in the temperature of the fuel cell reduces the activity of an electrochemical reaction that may damage the fuel cell. Thus, the lower voltage limit is preferably set to a value decreasing consistently with the temperature of the fuel cell to ease the limitation on the decrease in cell voltage. For example, the lower voltage limit for the low-efficiency operation is preferably set to be lower than that for the normal operation.

In this case, the control device preferably performs the low-efficiency operation when temperature is equal to or lower than a predetermined value at the time of the starting of the fuel cell system. Performing the low-efficiency operation controls a heat loss in the fuel cell to allow the fuel cell to warm up early.

The lower voltage limit setting device preferably sets the lower voltage limit to be lower when the fuel gas is in shortage during the low-efficiency operation than when the fuel gas is in shortage during the normal operation.

When the output voltage from the fuel cell is lower than the lower voltage limit, the control device desirably attempts to recover the cell voltage by carrying out one of a process of increasing an amount of fuel gas or oxidation gas supplied to the fuel cell, a process of limiting the output current from the fuel cell, and a process of stopping power generation.

In a transitive power generation condition with a variation in load, when a variation in the output voltage from the fuel cell is defined as $\Delta V$ and a variation in output current from the fuel cell is defined as $\Delta I$, the determination device calculates $|\Delta V/\Delta I|$, and when $|\Delta V/\Delta I|$ is equal to or larger than a first threshold, determines that the fuel gas is in shortage. When $|\Delta V/\Delta I|$ is smaller than the first threshold, the determination device determines that the oxidation gas is in shortage.

When the fuel gas is in shortage, an insufficient amount of protons is compensated for by electrolysis of water. Thus, $|\Delta V/\Delta I|$ is larger than the first threshold. When the oxidation gas is in shortage, the ohmic resistance of an electrolytic membrane becomes dominant to reduce $|\Delta V/\Delta I|$ below the first threshold. Comparison of $|\Delta V/\Delta I|$ with the first threshold enables the fuel gas shortage to be distinguished from the oxidation gas shortage.

In a steady-state power generation condition with no variation in load, when a variation in the output voltage from the fuel cell is defined as $\Delta V$ and a temporal variation is defined as $\Delta t$, the determination device calculates $|\Delta V/\Delta t|$, and when $|\Delta V/\Delta t|$ is equal to or larger than a second threshold, determines that the fuel gas is in shortage. When $|\Delta V/\Delta t|$ is smaller than the second threshold, the determination device determines that the oxidation gas is in shortage.

When the fuel gas is in shortage, an insufficient amount of protons is compensated for by electrolysis of water. Thus, $|\Delta V/\Delta t|$ is larger than the second threshold. When the oxidation gas is in shortage, the ohmic resistance of the electrolytic membrane becomes dominant to reduce $|\Delta V/\Delta t|$ below the second threshold. Comparison of $|\Delta V/\Delta t|$ with the second threshold enables the fuel gas shortage to be distinguished from the oxidation gas shortage.

In a preferred embodiment of the present invention, the determination device actually measures an anode potential of the fuel cell. When the anode potential of the fuel cell is higher than a predetermined threshold potential, the determination device determines that the fuel gas is in shortage. When the anode potential of the fuel cell is lower than the predetermined threshold potential, the determination device determines that the oxidation gas is in shortage. When the fuel gas is in shortage, the fuel cell applies electrolysis to water to generate protons to compensate for the fuel gas shortage. At this time, since the anode potential is higher than a certain threshold potential, comparison of the anode potential with the threshold potential allows determination of whether the fuel gas or the oxidation gas is in shortage. When the oxidation gas is determined to be in shortage, since the cell voltage is allowed to exhibit a negative value, the need for a limitation on an output from the fuel cell stack is eliminated. Thus, possible degradation of drivability can be inhibited.

The determination device calculates the cell voltage on a current-voltage characteristic map created under a condition which minimizes an increase in the anode potential of the fuel cell during the electrolysis of water. When the actual cell voltage is higher than the cell voltage on the current-voltage characteristic map, the determination device determines that the fuel gas shortage is not occurring. The condition which minimizes the increase in the anode potential of the fuel cell during the electrolysis of water refers to, for example, the condition under which a sufficient amount of moisture required to generate protons is present inside the fuel cell. Even if the cell voltage drops to a negative value owing to any factor, the cell voltage reduction factor is ensured not at least to be the fuel gas shortage as long as the current cell voltage belongs to an upper region of the current-voltage characteristic map described above. If the cell voltage reduction factor is not at least the fuel gas shortage, since the cell voltage is allowed to exhibit a negative value, the need for the limitation on the output from the fuel cell stack is eliminated. Thus, the possible degradation of the drivability can be inhibited.

Here, the current-voltage characteristic map may be (1) map data with temperature characteristics, (2) map data pre-corrected taking into account control delay time required to control the cell voltage, or (3) map data exhibiting a constant voltage value regardless of cell current. Using the map data for which the temperature characteristics or the control delay time is taken into account enables the cell voltage to be more closely controlled. On the other hand, using the map data exhibiting the constant voltage value regardless of the cell current enables the control of the cell voltage to be simplified.

BEST MODE FOR CARRYING OUT THE INVENTION

An embodiment according to the present invention will be described with reference to the drawings.

Figure 1:
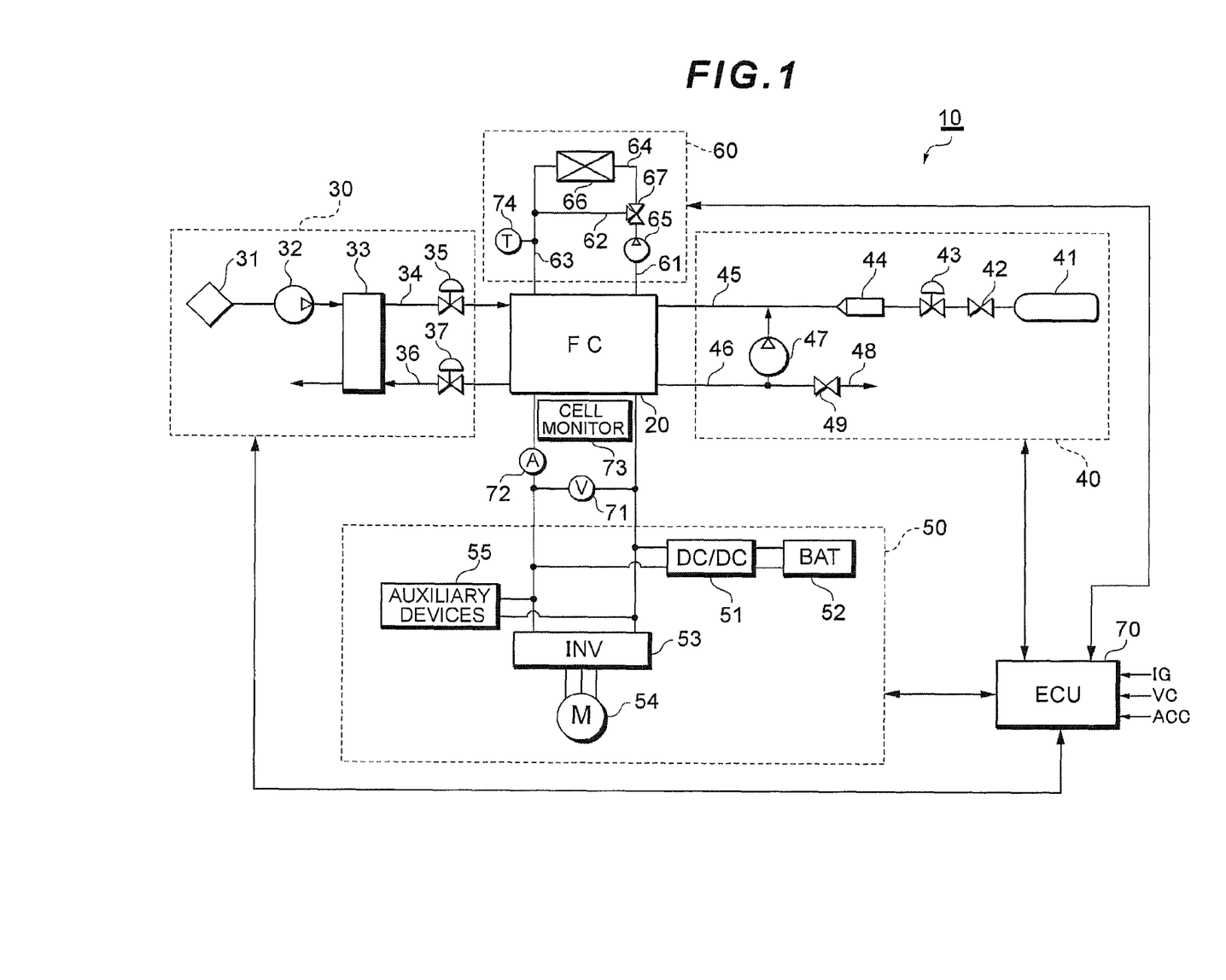
FIG. 1 is a diagram showing a configuration of a fuel cell system 10 according to the present embodiment.

FIG. 1 shows a configuration of a fuel cell system 10 according to the present embodiment.

The fuel cell system 10 functions as a vehicle-mounted power supply system mounted in a fuel cell vehicle. The fuel cell system 10 includes a fuel cell stack 20 that receives a supplied reaction gas (fuel gas and oxidation gas) to generate power, an oxidation gas supply line 30 through which air as an oxidation gas is supplied to the fuel cell stack 20, a fuel gas supply line 40 through which a hydrogen gas as a fuel gas is supplied to the fuel cell stack 20, a power line 50 that controls charging and discharging of power, a cooling system 60 through which the fuel cell stack 20 is cooled, and a controller (ECU) 70 that integrally controls the whole fuel cell system 10.

The fuel cell stack 20 is a solid polyelectrolyte cell stack made up of a plurality of cells stacked in series. In the fuel cell stack 20, an oxidation reaction expressed by Formula (1) occurs in an anode, and a reduction reaction expressed by Formula (2) occurs in a cathode. For the whole fuel cell stack 20, an electromotive reaction expressed by Formula (3) occurs.

$$H_2 \rightarrow 2H^+ + 2e^- \quad (1)$$

$$(1/2)O_2 + 2H^+ + 2e^- \rightarrow H_2O \quad (2)$$

$$H_2 + (1/2)O_2 \rightarrow H_2O \quad (3)$$

The fuel cell stack 20 includes a voltage sensor 71 attached thereto to detect an output voltage from the fuel cell stack 20, a current sensor 72 attached thereto to detect a generated current, and a cell monitor (cell voltage detector) 73 attached thereto to detect the voltage of each of the cells. The cell monitor 73 may detect the cell voltage for each cell or for every plural cells (cell module).

The oxidation gas supply line 30 includes an oxidation gas passage 34 through which an oxidation gas to be supplied to the cathode of the fuel cell stack 20 flows, and an oxidation off gas passage 36 through which an oxidation off gas discharged from the fuel cell stack 20 flows. The oxidation gas passage 34 includes an air compressor 32 that takes in the oxidation gas from atmosphere via a filter 31, a humidifier 33 that humidifies the oxidation gas to be supplied to the cathode of the fuel cell stack 20, and a throttle valve 35 that adjusts the amount of oxidation gas supplied. The oxidation off gas passage 36 includes a backpressure regulating valve 37 that regulates an oxidation gas supply pressure, and a humidifier 33 that exchanges moisture between the oxidation gas (dry gas) and the oxidation off gas (wet gas).

The fuel gas supply line 40 includes a fuel gas supply source 41, a fuel gas passage 45 through which the fuel gas to be fed from the fuel gas supply source 41 to the anode of the fuel cell stack 20 flows, a circulation passage 46 through which a fuel off gas discharged by the fuel cell stack 20 is returned to the fuel gas passage 45, a circulation pump 47 through which the fuel off gas in the circulation passage 46 is fed to the fuel gas passage 43 under pressure, and an exhaust and drain passage 48 divergently connected to circulation passage 47.

The fuel gas supply source 41 is composed of, for example, a high pressure hydrogen tank or hydrogen-occluded alloy and stores a hydrogen gas under a high pressure (for example, 35 MPa to 70 MPa). Opening a shutoff valve 42 allows the fuel gas to flow from the fuel gas supply source 41 to the fuel gas passage 45. The fuel gas has the pressure thereof reduced to, for example, about 200 kPa by a regulator 43 or an injector 44 before being supplied to the fuel cell stack 20.

The fuel gas supply source 41 may be composed of a reformer that generates a hydrogen-rich reformed gas from a hydrogen carbide-containing fuel, and a high-pressure gas tank in which the reformed gas generated by the reformer is pressurized and accumulated.

The regulator 43 is a device that regulates an upstream pressure (primary pressure) to a preset secondary pressure, and is composed of, for example, a mechanical pressure reducing valve that reduces the primary pressure. The mechanical pressure reducing valve includes a housing in which a backpressure chamber and a pressure regulating chamber are formed opposite each other across a diaphragm. In the pressure reducing valve, a backpressure in the backpressure chamber reduces the primary pressure to a predetermined pressure in the pressure regulating chamber. The secondary pressure is thus obtained.

The injector 44 is an electromagnetically driven on-off valve that enables a gas flow rate or gas pressure to be regulated by directly driving the valve disc at a predetermined driving period by means of an electromagnetic driving force to separate the valve disc from a valve seat. The injector 44 includes the valve seat with an injection hole through which a gas fuel such as a fuel gas is injected, a nozzle body through which the gas fuel is fed and guided to the injection hole, and the valve disc accommodated and held in the nozzle body so as to be movable in an axial direction (gas flow direction) of the nozzle body to open and close the injection hole.

An exhaust and drain valve 49 is disposed in the exhaust and drain passage 48. In response to an instruction from the controller 70, the exhaust and drain valve 49 is actuated to discharge moisture and the fuel off gas containing impurities in the circulation passage 46, to the exterior of the system. Opening the exhaust and drain valve 49 reduces the concentration of the impurities in the fuel off gas in the circulation passage 46. Thus, the concentration of hydrogen in the fuel off gas circulating through the circulation line can be increased.

The fuel off gas discharged via the exhaust and drain valve 49 is mixed with the oxidation off gas flowing through the oxidation off gas passage 34 and diluted by a diluter (not shown in the drawings). The circulation pump 47 cyclically supplies the fuel off gas in the circulation line to the fuel cell stack 20 by means of driving of a motor.

The power line 50 includes a DC/DC converter 51, a battery 52, a traction inverter 53, a traction motor 54, and auxiliary devices 55. The DC/DC converter 51 includes a function of increasing a DC voltage supplied by the battery 52 and outputting the increased DC voltage to the traction inverter 53, and a function of reducing DC power generated by the fuel cell stack 20 or regenerative power recovered by the traction motor 54 by means of regenerative braking to charge the battery 52. The functions of the DC/DC converter 51 control charging and discharging of the battery 52. Voltage conversion control performed by the DC/DC converter 51 controls operation points of (output voltage and output current from) the fuel cell stack 20.

The battery 52 functions as a storage source for surplus power, a storage source for regenerative energy during regenerative braking, and an energy buffer for a load variation associated with acceleration and deceleration of the fuel cell vehicle. For example, a secondary battery such as a nickel-cadmium battery, a nickel-hydrogen battery, or a lithium secondary battery is suitable as the battery 52.

The traction inverter 53 is, for example, a PWM inverter driven according to a pulse width modulation scheme. In accordance with a control instruction from the controller 70, the traction inverter 53 converts the DC voltage from the fuel cell stack 20 or the battery 52 into a three-phase AC voltage to control the rotating torque of the traction motor 54. The traction motor 54 is, for example, a three-phase AC motor making up a power source for the fuel cell vehicle.

The auxiliary devices 55 collectively refer to motors (power sources for, for example, pumps) arranged in the respective sections in the fuel cell system 10, inverters allowing the motors to be driven, and various vehicle-mounted auxiliary devices (for example, an air compressor, an injector, a cooling water circulation pump, and a radiator).

A cooling system 60 includes refrigerant passages 61, 62, 63, and 64 through which a refrigerant circulating through the interior of the fuel cell stack 20 flows, a circulation pump 65 that feeds the refrigerant under pressure, a radiator 66 that exchanges heat between the refrigerant and outside air, a three-way valve 67 that switches a circulation path for the refrigerant, and a temperature sensor 74 that detects the temperature of the refrigerant. During a normal operation following completion of a warming-up operation, the three-way valve 67 is controllably opened and closed such that the refrigerant flowing out from the fuel cell stack 20 flows through the refrigerant passages 61 and 64 and is cooled in the radiator 66 and then flows through the refrigerant passage 63 into the fuel cell stack 20 again. On the other hand, during the warming-up operation immediately after the starting of the system, the three-way valve 67 is controllably opened and closed such that the refrigerant flowing out from the fuel cell stack 20 flows though the refrigerant passages 61, 62, and 63 into the fuel cell stack 20 again.

The refrigerant temperature represents the temperature (catalyst temperature) of the fuel cell stack 20 and is utilized as an index used to optimize the operation control of the cell.

The controller 70 is a computer system including a CPU, a ROM, a RAM, and an I/O interface. The controller functions as a control device that controls the relevant sections (the oxidation gas supply line 30, the fuel gas supply line 40, the power line 50, and the cooling system 60) of the fuel cell system 10. For example, upon receiving a starting signal IG output by an ignition switch, the controller 70 starts operating the fuel cell system 10. The controller 70 then determines the power requirement for the whole system based on an accelerator opening degree signal ACC output by an accelerator sensor and a vehicle speed signal VC output by a vehicle speed sensor.

The power requirement for the whole system is the sum of vehicle traveling power and auxiliary device power. The auxiliary device power includes power consumed by vehicle-mounted auxiliary devices (the humidifier, the air compressor, a hydrogen pump, the cooling water circulation pump, and the like), power consumed by devices required to drive the vehicle (a speed change gear, a wheel control device, a steering device, a suspension system, and the like), and power consumed by devices disposed in a passenger space (an air conditioning device, a lighting system, an audio system, and the like).

The controller 70 determines the allocation of output power from the fuel cell stack 20 and output power from the battery 52 to control the oxidation gas supply line 30 and the fuel gas supply line 40 so that the amount of power generated by the fuel cell stack 20 equals to target power. The controller 70 also controls the DC/DC converter 51 to regulate the output voltage from the fuel cell stack 20 to control the operation points of (output voltage and output current from) the fuel cell stack 20. Moreover, the controller 70 outputs, for example, AC voltage instruction values for a U phase, a V phase, and a W phase to the traction inverter 53 as switching instructions to control the output torque and rotation speed of the traction motor 54 so as to obtain the target vehicle speed corresponding to the accelerator opening degree.

Figure 2:
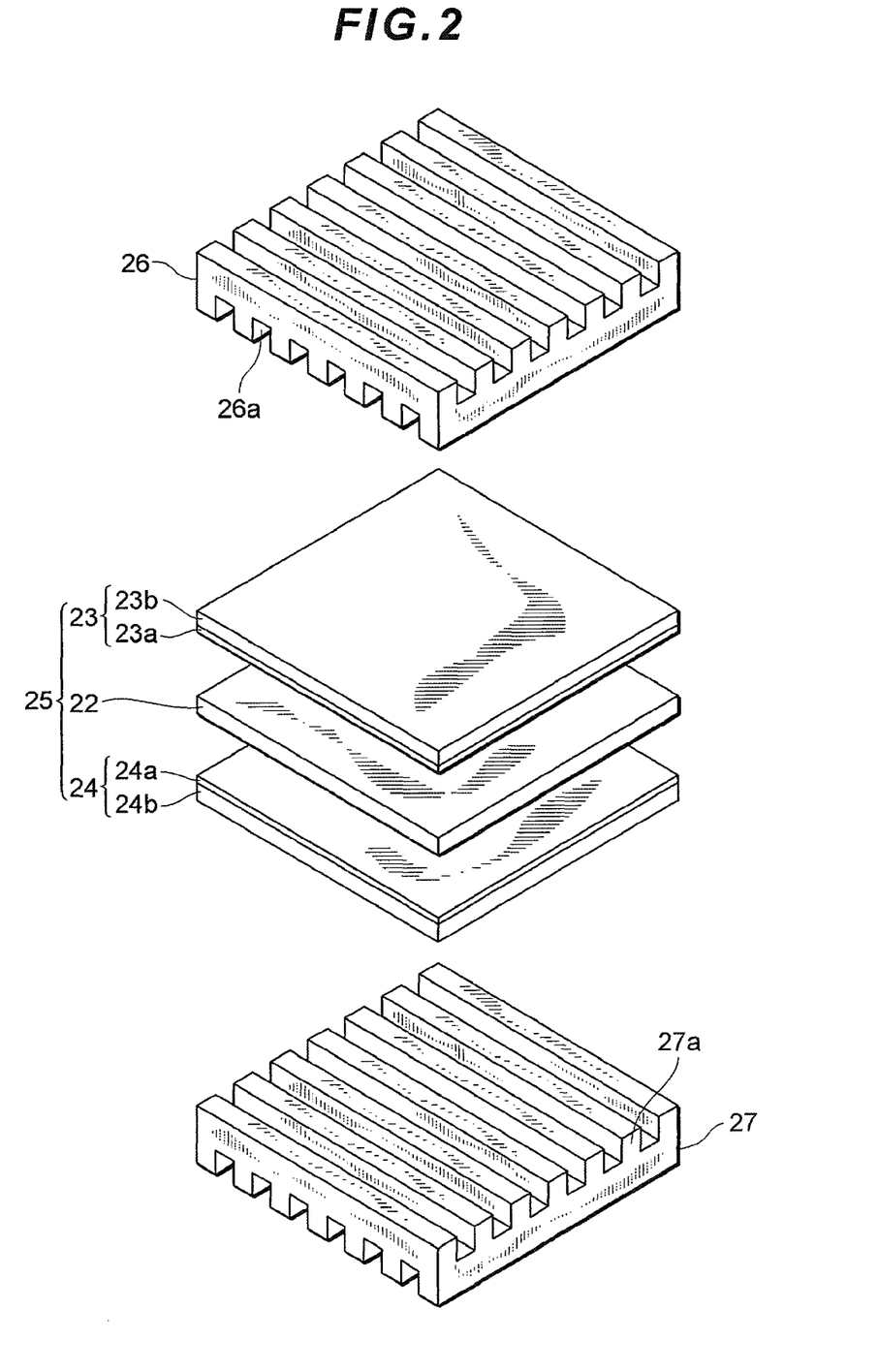
FIG. 2 is an exploded perspective view of a cell making up a fuel cell stack.

FIG. 2 is an exploded perspective view of cells 21 making up the fuel cell stack 20.

Each of the cells 21 is composed of an electrolytic membrane 22, an anode 23, a cathode 24, and separators 26 and 27. The anode 23 and the cathode 24 are diffusion electrodes making up a sandwich structure in which the electrolytic membrane 22 is sandwiched between the anode 23 and the cathode 24, which are arranged opposite each other. The separators 26 and 27, composed of a non-air-permeable conductive material, further sandwich the sandwich structure therebetween so as to form channels for the fuel gas between the separator 26 and the anode 23 and channels for the oxidation gas between the separator 27 and the cathode 24. Ribs 26a with a recess cross section are formed in the separator 26. The anode 23 abuts against the ribs 26a to close the openings of the ribs 26a to form fuel gas channels. Ribs 27a with a recess cross section are formed in the separator 27. The cathode 24 abuts against the ribs 27a to close the openings of the ribs 27a to form oxidation gas channels.

The anode 23 is composed mainly of carbon powder carrying a platinum-containing metal catalyst. The anode 23 includes a catalyst layer 23a that is in contact with the electrolytic membrane 22 and a gas diffusion layer 23b formed on a surface of the catalyst layer 23a and which is both air permeable and electronically conductive. Similarly, the cathode 24 includes a catalyst layer 24a and a gas diffusion layer 24b. More specifically, the catalyst layers 23a and 24a are formed by dispersing, in an appropriate organic solvent, carbon powder carrying platinum or an alloy made up of platinum and another metal, adding an appropriate amount of electrolytic solution to the solvent to obtain a mixture like paste, and applying the mixture onto the electrolytic membrane 22. The gas diffusion layers 23b and 24b are formed of carbon cloth, carbon paper, or carbon felt which is obtained by weaving yarns made up of carbon fibers. The electrolytic membrane 22 is a proton conductive ion exchange membrane formed of a solid polymer material, for example, a fluorine-containing resin. The electrolytic membrane 22 exhibits high electric conductivity in a wet condition. The electrolytic membrane 22, the anode 23, and the cathode 24 form a membrane-electrode assembly 25.

Embodiment 1

Now, cell voltage management according to Embodiment 1 will be outlined.

The controller 70 performs operation control while limiting the operation so as to prevent the cell voltage from decreasing below a lower voltage limit Vth. The controller 70 changes conditions for the operation limitation depending on the operation condition of the fuel cell stack 20. The operation condition is a concept collectively referring to physical quantities relating to the cell voltage reduction factors (a shortage of the supplied reaction gas, a decrease in stack temperature, and the like). The conditions for the operation limitation refer to conditions for limiting the cell operation (for example, the lower voltage limit Vth, indicating the lower limit of the power generation tolerable range). The severity of the conditions for the operation limitation is desirably reduced consistently with the stack temperature. For example, the lower voltage limit Vth for low-temperature starting is desirably set to be lower than that for the normal operation (the normal operation refers to a cell operation performed within a temperature range suitable for the cell operation after the warming-up operation is completed. The normal operation is synonymous with normal power generation. The low-temperature starting refers to starting requiring the warming-up operation because the temperature during the starting is equal to or lower than a predetermined temperature). The lower voltage limit Vth may be provided with temperature characteristics so as to decrease gradually with temperature decrease.

If the cell voltage reduction factor is the shortage of the fuel gas supplied to the anode 23, continuous power generation with the cell 21 offering a reverse potential may severely damage the cell 21. Thus, the lower voltage limit Vth is set to be higher to strictly limit a decrease in cell voltage so as to prevent the possible reverse potential. The lower voltage limit Vth is desirably set to a value increasing consistently with the shortage amount of the supplied hydrogen with respect to the amount of hydrogen required for adequate reaction with oxygen (that is, a theoretical value).

On the other hand, if the cell voltage reduction factor is the shortage of the oxidation gas supplied to the cathode 24, the continuous power generation with the cell 21 offering the reverse potential less severely damages the cell 21 than when the fuel gas is in shortage. Thus, to allow the reverse potential to be generated, the lower voltage limit Vth for the oxidation gas shortage is preferably set to be lower than that for the fuel gas shortage to relatively ease the limitation on the decrease in cell voltage. When the amount of the supplied oxygen is much below the amount of oxygen required for adequate reaction with hydrogen (that is, the theoretical value), the lower voltage limit Vth is desirably set to be higher than that set when the shortage is small.

A relationship between the cell voltage reduction factor and the lower voltage limit Vth will be summarized. Under the condition that the temperature observed when the fuel gas is in shortage is the same as that observed when the oxidation gas is in shortage, the fuel gas shortage may more severely damage the fuel cell stack 20 than the oxidation gas shortage. Thus, the lower voltage limit Vth for the fuel gas shortage is desirably set to be higher than that for the oxidation gas shortage.

Figure 3:
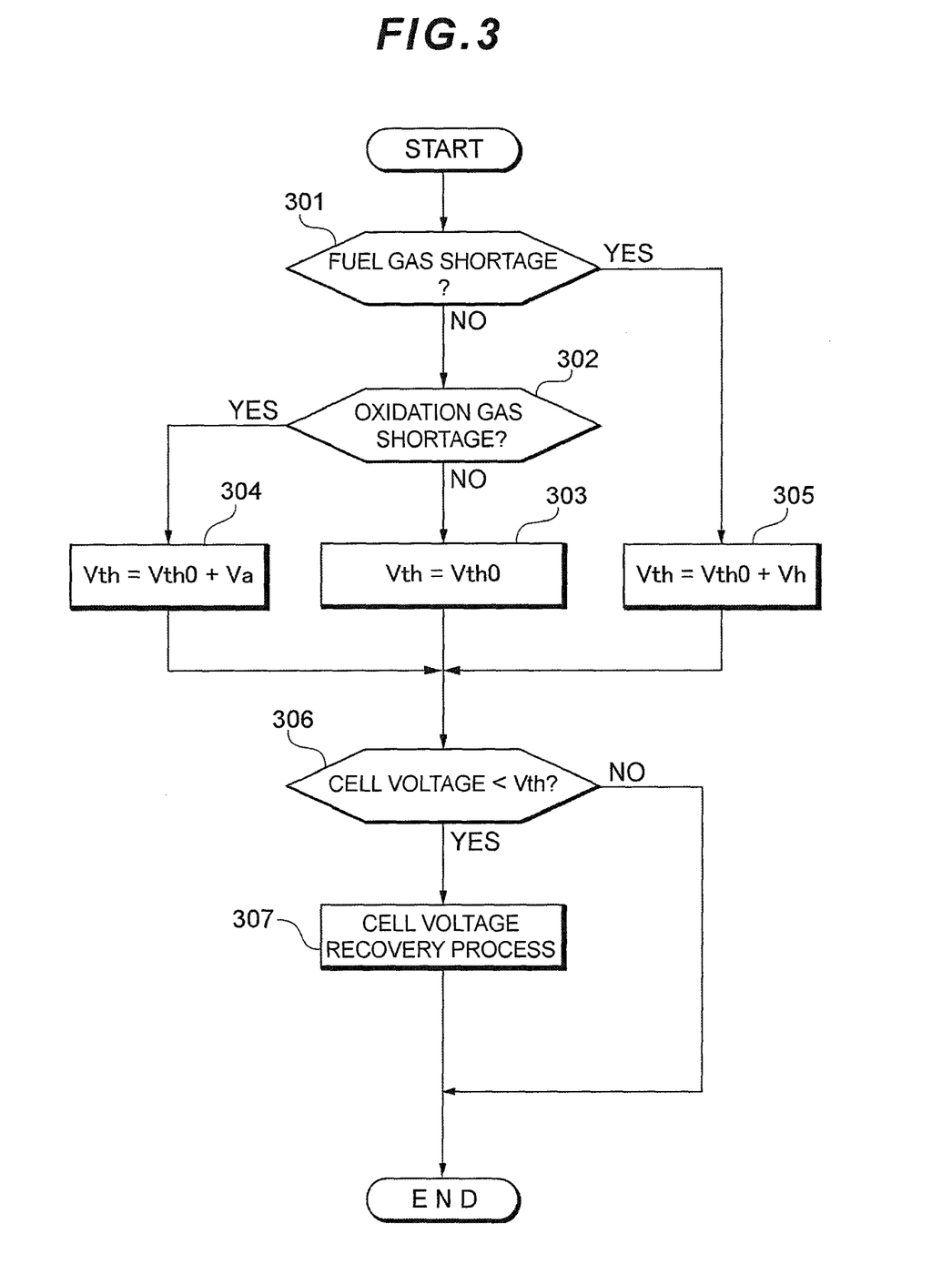
FIG. 3 is a flowchart showing a cell voltage management routine during a normal operation.

FIG. 3 is a flowchart showing a cell voltage management routine for the normal operation.

The routine is invoked at equal period intervals during the normal operation and repeatedly executed by the controller 70. The routine treats the lower voltage limit Vth as a variable, Vth0 as a constant determined by the temperature (the lower voltage limit provided when the reaction gas is sufficiently supplied), Vh as a constant (the amount by which the lower voltage limit is increased) determined according to the shortage amount of the supplied hydrogen with respect to the amount of hydrogen required for adequate reaction with oxygen (that is, the theoretical value), and Va as a constant (the amount by which the lower voltage limit is increased) determined according to the shortage amount of the supplied oxygen with respect to the amount of oxygen required for adequate reaction with hydrogen (that is, a theoretical value). The routine updates the value of the lower voltage limit Vth at every arithmetic period.

The controller 70 determines whether or not the fuel gas is in shortage (step 301). If the fuel gas is in shortage (step 301; YES), the controller 70 updates the value of the lower voltage limit Vth by adding Vh to Vth0 (step 305). At this time, the value Vh is increased consistently with the shortage amount of the supplied hydrogen with respect to the amount of hydrogen required for adequate reaction with oxygen (that is, the theoretical value). As a preferred embodiment of the present invention, proportional control is preferable which increases the value Vh in proportion to the shortage amount of the supplied hydrogen.

In this case, the value Vh is set to be larger than the value Va under the condition that the temperature observed when the fuel gas is in shortage is the same as that observed when the oxidation gas is in shortage.

If the fuel gas is not in shortage (step 301; NO), the controller 70 determines whether or not the oxidation gas is in shortage (step 302). If the oxidation gas is in shortage (step 302; YES), the controller 70 updates the value of the lower voltage limit Vth by adding Va to Vth0 (step 304). At this time, the value Va is increased consistently with the shortage amount of the supplied oxygen with respect to the amount of oxygen required for adequate reaction with hydrogen (that is, the theoretical value). As a preferred embodiment of the present invention, proportional control is preferable which increases the value Va in proportion to the shortage amount of the supplied oxygen.

If the oxidation gas is not in shortage (step 302; NO), the controller 70 updates the value of the lower voltage limit Vth to Vth0 (step 303).

The controller 70 then determines whether or not the cell voltage is lower than the lower voltage limit Vth (step 306). If the cell voltage is equal to or higher than the lower voltage limit Vth (step 306; NO), the controller 70 exits the cell voltage management routine. If the cell voltage is lower than the lower voltage limit Vth (step 306; YES), the controller 70 executes a cell voltage recovery process (step 307).

Preferably, the cell voltage recovery process is one of a process for compensating for the reaction gas shortage (to compensate for the fuel gas shortage, for example, a process is executed which controls the injector 44 so as to increase the supply pressure of the fuel gas supplied to the fuel cell stack 20 or which controls the rotation speed of the circulation pump 47 so as to increase the flow rate of the fuel gas flowing into the fuel cell stack 20. To compensate for the oxidation gas shortage, a process is executed which, for example, controls the rotation speed of the air compressor 32 so as to increase the supply amount of the oxidation gas flowing into the fuel cell stack 20.), a process of limiting the output current from the fuel cell stack 20 (for example, a process of controlling the DC/DC converter 51 so as to limit a current obtained from the fuel cell stack 20); a process of stopping the power generation. One of these processes is executed to attempt to recover the cell voltage.

Since the output from the fuel cell stack 20 is limited, the output from the fuel cell stack 20 may not meet a power requirement for the system. In this case, the shortage of power is compensated for by the battery 52.

Now, a process of determining whether or not the reaction gas is in shortage will be described with reference to FIGS. 4 and 5. The determination process is executed in steps 301 and 302, described above.

Figure 4:
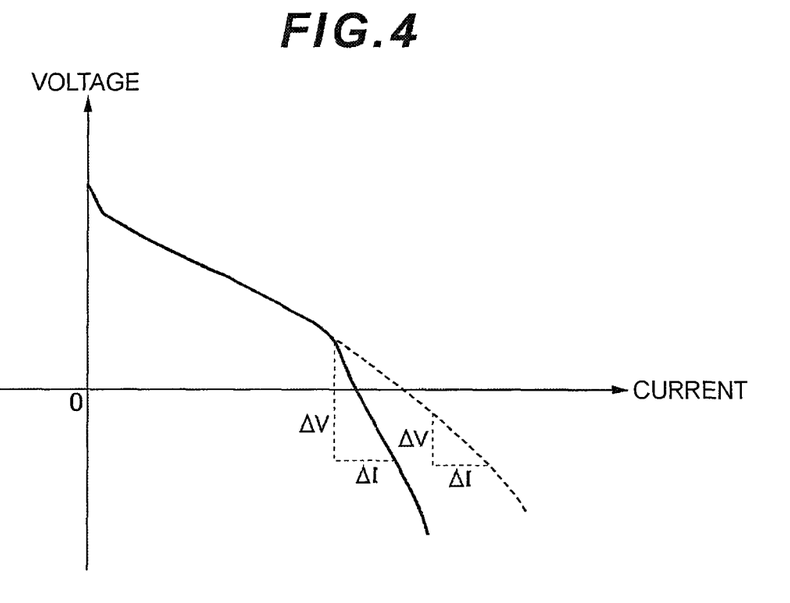
FIG. 4 is a graph showing an I-V characteristic of the fuel cell stack observed when a reaction gas is in shortage in a transitive power generation condition with a variation in load.

FIG. 4 shows an I-V characteristic (current-voltage characteristic of the fuel cell stack 20 observed when the reaction gas is in shortage in a transitive power generation condition with a variation load. A solid line indicates the characteristic observed when the fuel gas is in shortage. A dashed line indicates the I-V characteristic observed when the oxidation gas is in shortage. As seen in this graph, $|\Delta V/\Delta I|$ observed when the fuel gas is in shortage is larger than that observed when the oxidation gas is in shortage. The reason can be explained as follows.

When the fuel gas is in shortage, a power generation current cannot be maintained only by protons resulting from the oxidation reaction ($H_2 \rightarrow 2H^+ + 2e^-$) in the anode 23. Thus, the cell 21 generates protons through electrolysis of water in order to compensate for the fuel gas shortage. At this time, the cell 21 electrically decomposes the water by obtaining energy from another cell 21 to rapidly increase the anode potential up to a potential at which the electrolysis of water progresses. As a result, the anode potential increases rapidly above the cathode potential to rapidly make the cell voltage negative (the cell voltage exhibits the reverse potential). This means that $|\Delta V/\Delta I|$ observed when the fuel gas is in shortage is larger than that observed when the fuel gas is not in shortage. It should be noted that if V decreases, $\Delta V/\Delta I$ has a negative value.

A change in voltage is preferably detected near 0 V to determine whether the reverse potential results from the fuel gas shortage or the oxidation gas shortage. For example, detecting a change in voltage at 0.6 V or lower enables determination of whether the reverse potential, corresponding to a voltage change of a large absolute value, results from the fuel gas shortage or the oxidation gas shortage.

When the anode potential is high, the platinum catalyst may be ionized and eluted or the carbon carrying the platinum catalyst may be oxidized. These phenomena may degrade the performance of the catalyst. Thus, the possible reverse potential needs to be avoided.

On the other hand, when the oxidation gas is in shortage, protons passing from the anode 23 through the electrolytic membrane 22 to the cathode 24 cannot react with oxygen. Thus, the protons bond to electrons flowing through an external circuit (power line 50) to generate hydrogen ($2H^+ + 2e^- \rightarrow H^2$). In this case, since the ohmic resistance of the electrolytic membrane 22 is dominant, there is no significant difference between $|\Delta V/\Delta I|$ observed when the oxidation gas is in shortage and $|\Delta V/\Delta I|$ observed when the oxidation gas is not in shortage.

The above discussions will be summarized. In the transitive power generation condition with a variation in load, Formula (4) holds true when the fuel gas is in shortage, and Formula (5) holds true when the oxidation gas is in shortage. Here, a threshold X(T) is a function of a temperature T.

$$|\Delta V/\Delta I| \geq X(T) \quad (4)$$

$$|\Delta V/\Delta I| < X(T) \quad (5)$$

Figure 5:
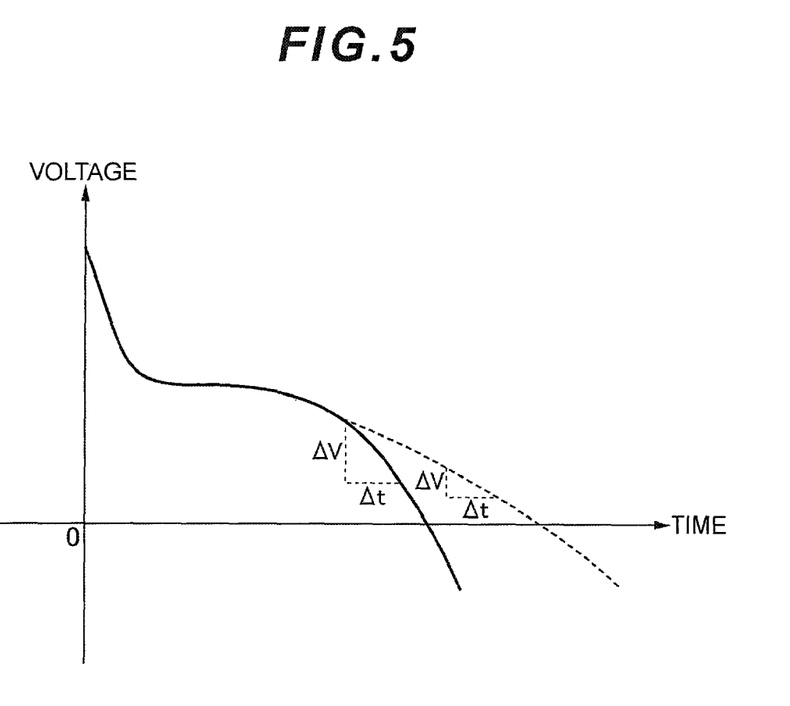
FIG. 5 is a graph showing a V-t characteristic of the fuel cell stack observed when the reaction gas is in shortage in a steady-state power generation condition with no variation in load.

FIG. 5 shows a V-t characteristic (voltage-time characteristic) of the fuel cell stack 20 observed when the reaction gas is in shortage in the steady-state power generation condition with no variation in load. Even with a constant load (load current), the gas containing moisture flows constantly through the gas channels inside the fuel cell stack 20. Thus, for example, large droplets may cover a surface of the electrode to cause accidental flooding, resulting in a temporary reaction gas shortage. A solid line indicates the V-t characteristic observed when the fuel gas is in shortage. A dashed line indicates the V-t characteristic observed when the oxidation gas is in shortage. As seen in this graph, $|\Delta V/\Delta t|$ observed when the fuel gas is in shortage is larger than that observed when the oxidation gas is in shortage. The reason can be explained as is the case with the variation in the I-V characteristic of the fuel cell stack 20 observed when the reaction gas is in shortage in the transitive power generation condition with a variation in load. It should be noted that if V decreases, $\Delta V/\Delta t$ has a negative value.

The above discussions will be summarized. In the steady-state power generation condition with no variation in load, Formula (6) holds true when the fuel gas is in shortage, and Formula (7) holds true when the oxidation gas is in shortage. Here, a threshold Y(T) is a function of the temperature T.

$$|\Delta V/\Delta t| \geq Y(T) \quad (6)$$

$$|\Delta V/\Delta t| < Y(T) \quad (7)$$

As is appreciated from the above description, the controller 70 functions as a determination device that determines whether the cell voltage reduction factor is the fuel gas shortage or the oxidation gas shortage, a lower voltage limit setting device that sets the lower voltage limit according to the cell voltage reduction factor, and a control device that controls the output voltage from the fuel cell stack 20 so as to prevent the cell voltage from decreasing below the lower voltage limit.

Embodiment 2

Cell voltage management in a low-temperature environment according to Embodiment 2 will be described.

Figure 6:
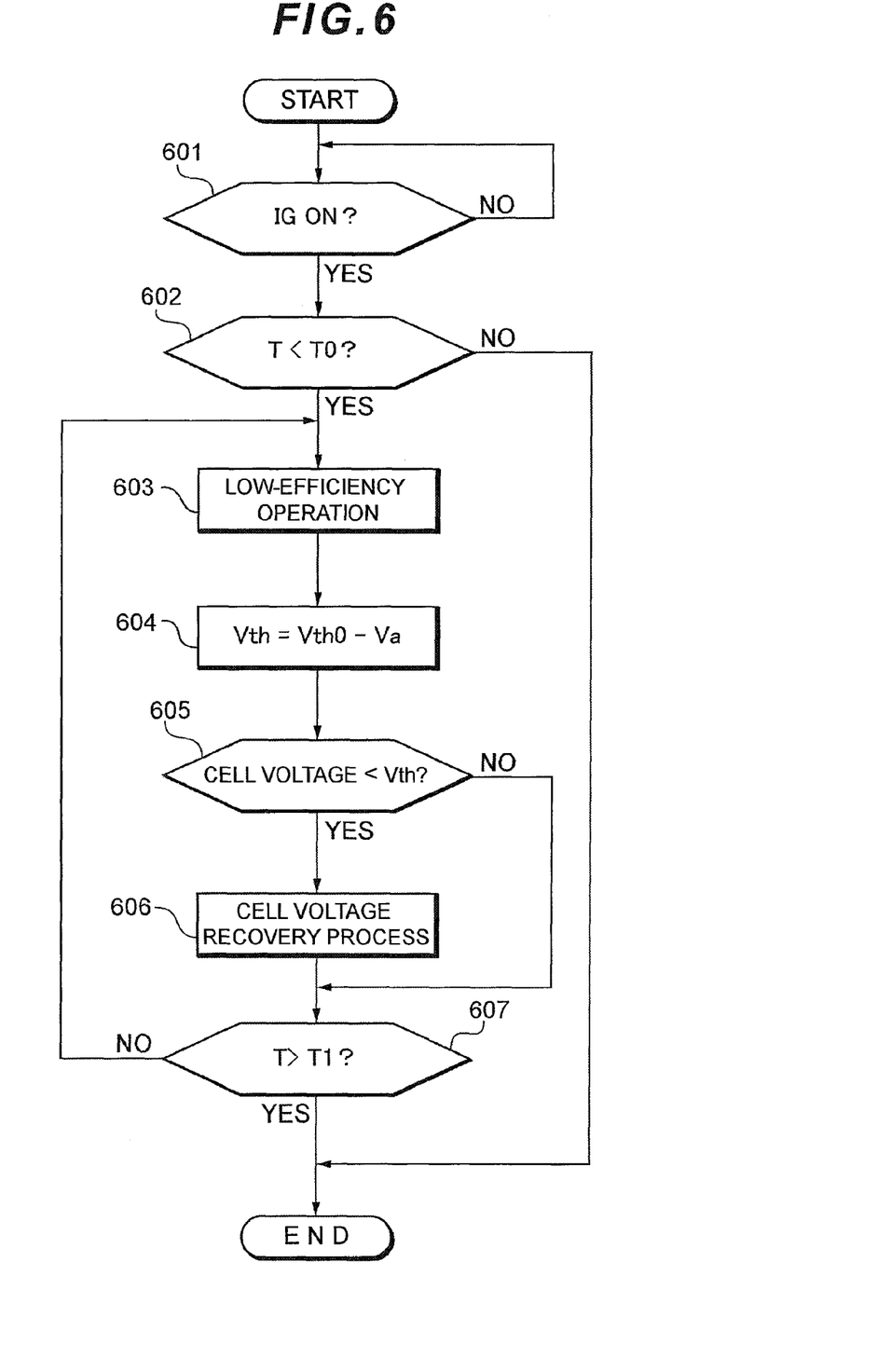
FIG. 6 is a flowchart showing a low-temperature starting routine.

FIG. 6 is a flowchart showing a low-temperature starting routine. The routine is invoked during a low-efficiency operation and executed by the controller 70. The low-efficiency operation refers to an operation of controlling the supply amount of the reaction gas supplied to the fuel cell stack 20 with an air stoichiometry set to about 1.0 so as to increase a power loss for operation at a low power generation efficiency. The air stoichiometry refers to an oxygen excess rate, and indicates how excess the supplied oxygen is with respect to the amount of oxygen required for adequate reaction with hydrogen. Performing the low-efficiency operation with the air stoichiometry set to a small value increases concentration overvoltage and thus a heat loss (power loss) contained in energy obtained through the reaction between hydrogen and oxygen. The low-efficiency operation is utilized during, for example, low-temperature starting to intentionally increase the heat loss to quickly warm up the fuel cell stack 20.

Upon receiving a starting signal IG output by an ignition switch (step 601; YES), the controller 70 reads a detection value from a temperature sensor 74 to determine whether or not a refrigerant temperature T is lower than a threshold temperature T0 (step 602). The threshold temperature T0 is a temperature based on which whether or not to perform the low-efficiency operation is determined. The threshold temperature T0 is set to, for example, about 0° C.

If the refrigerant temperature T is not lower than the threshold temperature T0 (step 602; NO), the low-efficiency operation need not be performed. Thus, the controller 70 exits the low-temperature starting routine, and executes a normal starting process routine (not shown in the drawings).

On the other hand, if the refrigerant temperature T is lower than the threshold temperature T0 (step 602; YES), the controller 70 performs the low-efficiency operation with the valve opening degree of the throttle valve 35 reduced to set the air stoichiometry to about 1.0 (step 603). The fuel cell stack 20 is then warmed up by the heat loss (heat energy) resulting from the low-efficiency operation.

The controller 70 updates the lower voltage limit Vth by subtracting Va from Vth0 (step 604). At this time, the value Va is increased with decreasing temperature.

The controller 70 then determines whether or not the cell voltage is lower than the lower voltage limit Vth (step 605). If the cell voltage is lower than the lower voltage limit Vth (step 605; YES), the controller 70 executes the cell voltage recovery process (step 606). If the cell voltage is equal to or higher than the lower voltage limit Vth (step 605; NO), the controller 70 skips the cell voltage recovery process.

The controller 70 reads the detection value from the temperature sensor 74 to determine whether or not the refrigerant temperature T is higher than a threshold temperature T1 (step 607). The threshold temperature T1 is a temperature based on which whether or not the warm-up operation is completed is determined.

If the refrigerant temperature T is not higher than the threshold temperature T1 (step 607; YES), the controller 70 returns to the processing in step 603. If the refrigerant temperature T is higher than the threshold temperature T1 (step 607; NO), the controller 70 exits the low-temperature starting routine.

During the low-efficiency operation of intentionally causing the oxidation gas shortage in the low-temperature environment as described above, possible damage on the cell 21 by continuous power generation with the cell 21 offering the reverse potential is less severe than that on the cell 21 by the oxidation gas shortage during the normal operation. Thus, to allow the reverse potential to be generated, the lower voltage limit Vth set for the low-efficiency operation is adjusted to be lower than that set for the normal operation to ease the limitation on the decrease in cell voltage.

In the description of Embodiment 1, the lower voltage limit Vth set for the fuel gas shortage is adjusted to be higher than the lower voltage limit Vth set for the oxidation gas shortage (steps 304 and 305). This is based on the fact that the temperature observed when the fuel gas is in shortage is the same as that observed when the oxidation gas is in shortage. Under the condition that the temperature is constant, the possible damage on the fuel cell stack 20 by the fuel gas shortage is severer than that on the fuel cell stack 20 by the oxidation gas shortage. Thus, the lower voltage limit Vth needs to be adjusted according to the cell voltage reduction factor. In contrast, in Embodiment 2, the lower voltage limit Vth set for the low-efficiency operation is adjusted to be lower than that set for the normal operation (step 604). The reason is that during the low-efficiency operation, the temperature of the fuel cell stack 20 is lower than that during the normal operation, reducing the activity of the electrochemical reaction, which may damage the fuel cell stack 20.

Thus, additionally, under the condition that the temperature observed when the fuel gas is in shortage is the same as that observed when the oxidation gas is in shortage, adjusting the lower voltage limit Vth set for the low-efficiency operation to be lower than that set for the normal operation (step 604) is consistent with adjusting the lower voltage limit Vth set for the fuel gas shortage to be higher than that set for the oxidation gas shortage (steps 304 and 305).

In Embodiments 1 and 2, whether or not the cell voltage is lower than the lower voltage limit Vth may be determined (steps 306 and 606) for the cell voltage of each cell 21 or for the sum of the cell voltages of a plurality of the cells 21.

With the fuel cell system 10 according to Embodiments 1 and 2, the lower voltage limit is changed depending on the cell voltage reduction factor. Consequently, the tolerable range of power generation can be flexibly changed.

Embodiment 3

Now, cell voltage management according to Embodiment 3 will be described. The cell voltage management described below is assumed to be used mainly for the normal operation. However, owing to the lack of the temperature limitation, the cell voltage management can in principle be applied to the low temperature environment (for example, during the low-efficiency operation).

(1) Cell Voltage Management Based on the Cell Electrode Potential

Figure 7:
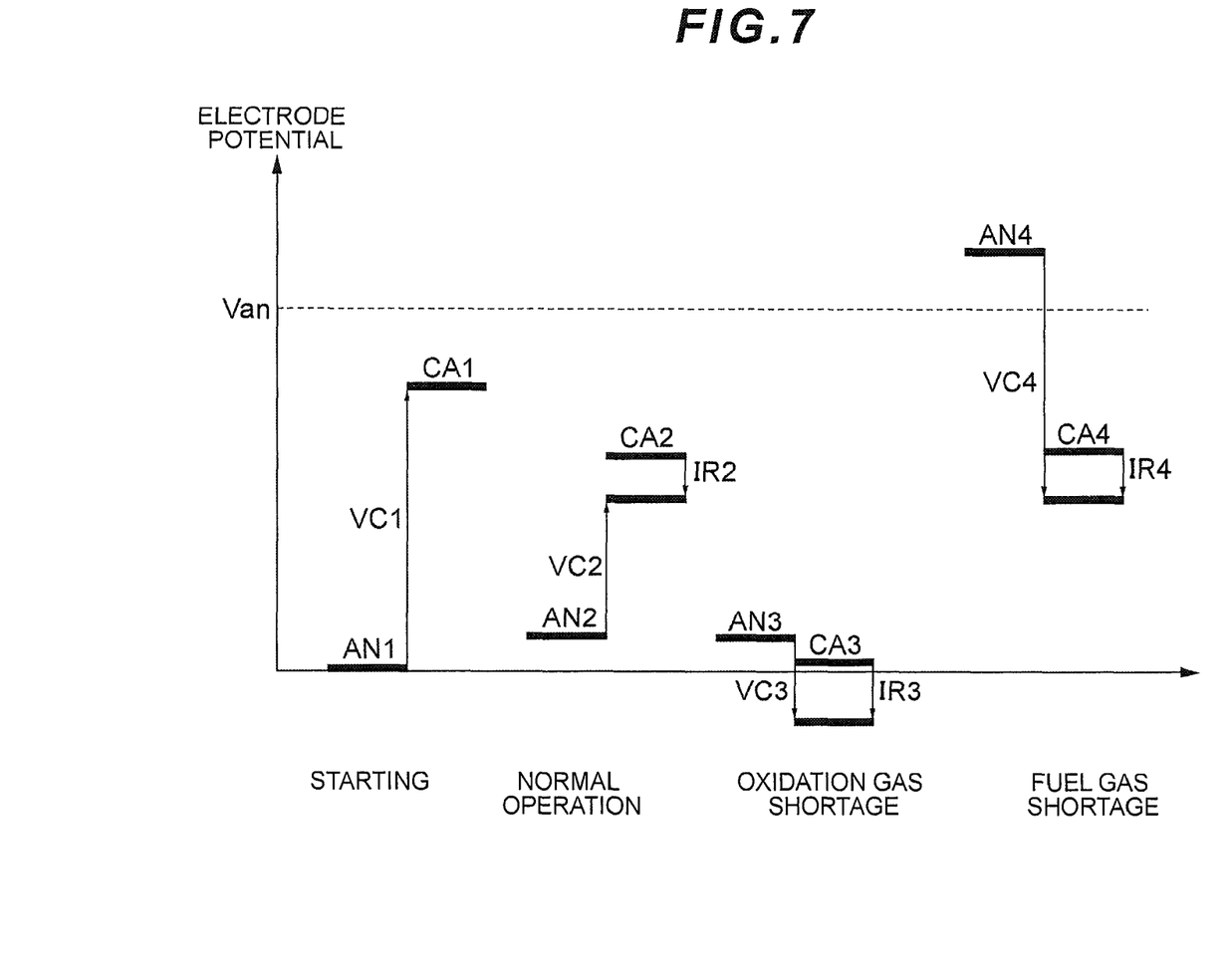
FIG. 7 is a diagram illustrating cell voltage management based on a cell electrode potential.

FIG. 7 shows a variation in electrode potential, that is, the electrode potentials measured during the starting and the normal operation and when the oxidation gas is in shortage and when the fuel gas is in shortage. During the starting, the output voltage from the fuel cell stack 20 is set to an open end voltage, resulting in a zero output current. At this time, a cathode potential CA1 exhibits no voltage drop caused by a DC resistance component and is set to the open end voltage. Furthermore, an anode potential AN1 remains zero. A cell voltage VC1 during the starting is equal to a voltage value (open end voltage) obtained by subtracting the anode potential AN1 during the starting from the cathode potential CA1 during the starting. The cell voltage VC1 per unit cell is about 1.0 V.

During the normal operation, the anode potential AN2 increases up to a predetermined positive value determined by the electrochemical reaction. On the other hand, a cathode potential CA2 exhibits a voltage drop IR2 caused by the DC resistance component. A cell voltage VC2 during the normal operation is equal to a voltage value VC2 obtained by subtracting the anode potential AN2 during the normal operation from the cathode potential CA2 during the normal operation. The cell voltage VC2 per unit cell is about 0.6 V.

When the oxidation gas is in shortage, comparison of an anode potential AN3 with the anode potential AN2 during the normal operation indicates almost no potential variation. On the other hand, a cathode potential CA3 is lower than the cathode potential CA2 during the normal operation and exhibits a voltage drop IR3 caused by the DC resistance component. Thus, the cathode potential CA3 is lower than the anode potential AN3. A cell voltage VC3 measured when the oxidation gas is in shortage is equal to a voltage value VC3 obtained by subtracting the anode potential AN3 measured when the oxidation gas is in shortage from the cathode potential CA3 measured when the oxidation gas is in shortage. Since the cathode potential CA3 is lower than the anode potential AN3, the cell voltage VC3 has a negative value.

When the fuel gas is in shortage, a cathode potential CA4 exhibits a voltage drop IR4 caused by the DC resistance component. However, comparison of the cathode potential CA4 with the cathode potential CA2 during the normal operation indicates almost no potential variation. On the other hand, an anode potential AN4 is higher than the anode potential AN2 during the normal operation. Thus, protons are generated through the electrolysis of water to compensate for the fuel gas shortage. A cell voltage VC4 measured when the fuel gas is in shortage is equal to a voltage value VC4 obtained by subtracting the anode potential AN4 measured when the fuel gas is in shortage from the cathode potential CA4 measured when the fuel gas is in shortage. Since the cathode potential CA4 is lower than the anode potential AN4, the cell voltage VC4 has a negative value.

Here, it should be noted that when the oxidation gas is in shortage, the anode potential AN3 is not higher than a predetermined threshold potential Van but that when the fuel gas is in shortage, the anode potential AN4 is higher than the threshold potential Van because protons are generated by the electrolysis of water. The threshold potential Van may be set to a value within a potential range reached by the anode potential during the electrolysis of water, the value being close to a potential (for example, 1.3 V) at which the platinum catalyst contained in the catalyst layer of the membrane-electrode assembly 25 starts to be ionized. By providing the fuel cell stack 20 with a measurement circuit (not shown in the drawings) that measures the anode potential, the controller 70 can determine whether or not the reaction gas is in shortage based on the anode potential.

For example, the controller 70 monitors an output signal from the cell monitor 73 at predetermined arithmetic period intervals. Upon detecting that the cell voltage has decreased down to a negative value, the controller 70 compares the anode potential with the threshold potential Van. When the comparison indicates that the anode potential is higher than the threshold potential Van, the controller 70 determines that the fuel gas is in shortage. When the comparison indicates that the anode potential is lower than the threshold potential Van, the controller 70 determines that the oxidation gas is in shortage. This determination process is applicable to the fuel gas shortage determination process (step 301) in Embodiment 1 and the oxidation gas shortage determination process (step 302). When the controller 70 determines that the fuel gas is in shortage, the processing in steps 305, 306, and 307 in Embodiment 1 is executed. When the controller 70 determines that the oxidation gas is in shortage, the processing in steps 304, 306, and 307 in Embodiment 1 is executed. However, when the oxidation gas is in shortage, the cell 21 is prevented from being electrochemically damaged. The cell voltage recovery process (step 307) such as the output limitation process may be omitted to allow the cell voltage to exhibit a negative value.

The above-described cell voltage management based on the cell electrode potential enables determination of whether or not the cell voltage reduction factor is the fuel gas shortage or the oxidation gas shortage. Thus, when the controller determines that oxidation gas is in shortage, the output limitation may be avoided to allow the cell voltage to decrease. Therefore, possible degradation of drivability can be avoided.

(2) Cell Voltage Management Based on the I-V Characteristic Map

Figure 8:
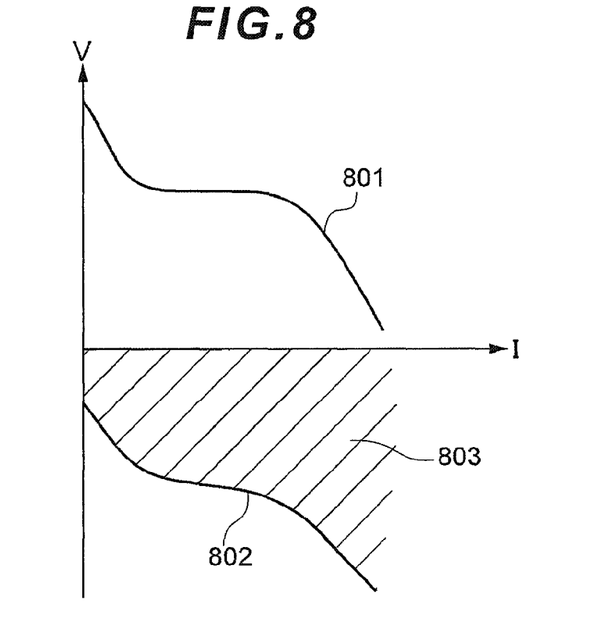
FIG. 8 is a diagram illustrating cell voltage management based on the I-V characteristic.

FIG. 8 shows an I-V characteristic map of the cell 21. The axis of abscissa indicates the cell current, and the axis of ordinate indicates the cell voltage. An I-V characteristic map 801 indicates the I-V characteristic observed during the normal operation on the assumption that an appropriate amount of reaction gas is supplied to the cell 21. An I-V characteristic map 802 indicates the I-V characteristic observed on the assumption that an insufficient amount of fuel gas is supplied to the cell 21 and that a sufficient amount of moisture required to generate protons so as to compensate for the fuel gas shortage is stored inside the fuel cell stack 20. In such a situation, the sufficient amount of moisture required to generate protons is present, thus minimizing the possible decrease in cell voltage during the electrolysis of water. Here, it should be noted that even if the cell voltage drops to a negative value owing to any factor, the cell voltage reduction factor is ensured not at least to be the fuel gas shortage as long as the current cell voltage belongs to a tolerable range 803. Here, the tolerable range 803 is such that within the range, the cell voltage exhibits a negative value, and corresponds to an upper part of the I-V characteristic map 802. However, it should be noted that even if the cell voltage decreases below the I-V characteristic map 802, this does not necessarily indicate that the fuel gas shortage is occurring. This characteristic can be utilized to determine whether or not the fuel gas is in shortage.

For example, the controller 70 monitors the output signal from the cell monitor 73 at predetermined arithmetic period intervals. Upon detecting that the cell voltage has dropped to a negative value, the controller 70 compares the voltage value of the I-V characteristic map 802 (the cell voltage on the I-V characteristic map 802 corresponding to the cell current measured when the cell voltage drops to the negative voltage) with the actual cell voltage. If the comparison indicates that the actual cell voltage is higher than the voltage value of the I-V characteristic map 802 (if the actual cell voltage belongs to the tolerable range 803), the controller 70 determines that the fuel gas is not in shortage. This determination process is applicable to the fuel gas shortage determination process (step 301) in Embodiment 1. When the controller 70 determines that the fuel gas is in shortage, the processing in steps 305, 306, and 307 in Embodiment 1 is executed. When the fuel gas is not in shortage, the decrease in cell voltage is prevented from damaging the cell 21 and is thus allowed. Moreover, the need for the output limitation on the fuel cell stack 20 is eliminated. The I-V characteristic map 802 may be held in a memory accessible to the controller 70.

Now, variations of the cell voltage management based on the I-V characteristic will be described with reference to FIGS. 9 to 11.

Figure 9:
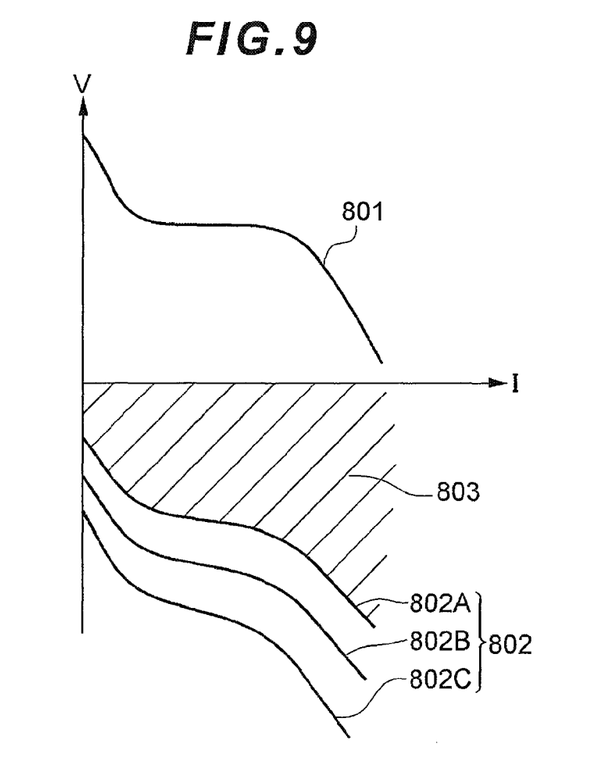
FIG. 9 is a diagram illustrating the cell voltage management based on the I-V characteristic.

FIG. 9 shows the I-V characteristic map 802 for which temperature characteristics are taken into account. I-V characteristic maps 802A, 802B, and 802C indicate I-V characteristics under different temperature environments observed on the assumption that an insufficient amount of fuel gas is supplied to the cell 21 and that a sufficient amount of moisture required to generate protons so as to compensate for the fuel gas shortage is stored inside the fuel cell stack 20. The absolute value of an activation overvoltage increases with decreasing temperature. This increases the degree of the decrease in cell voltage in a low current region. Furthermore, proton transportation resistance increases with decreasing temperature. This increases the inclination of a linear region of the I-V characteristic. This is why the I-V characteristic map 802B indicates an I-V characteristic observed in an environment colder than that for the I-V characteristic map 802A and the I-V characteristic map 802C indicates an I-V characteristic observed in an environment colder than that for the I-V characteristic map 802B. As shown in the I-V characteristic maps 802A, 802B, and 802C, the tolerable range 803 of the decrease in cell voltage increases gradually with decreasing temperature. Using the I-V characteristic map 802, for which the temperature characteristics are taken into account, enables closer cell voltage management.

Figure 10:
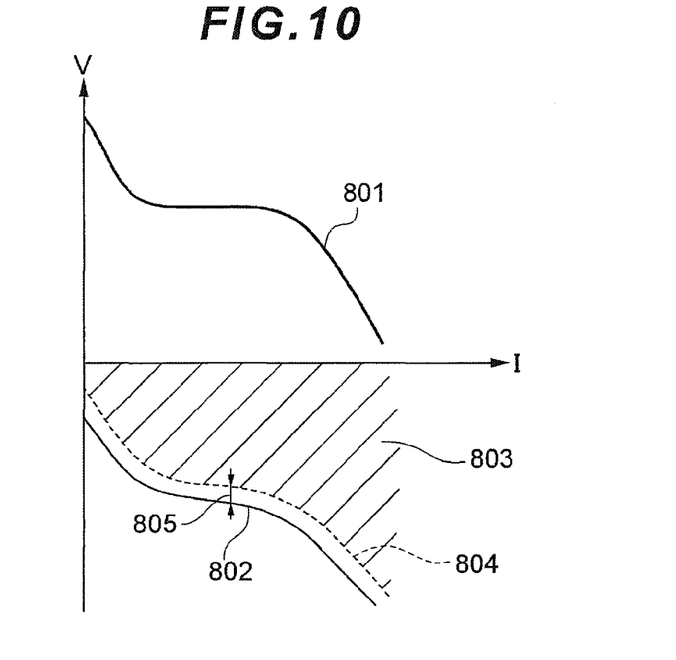
FIG. 10 is a diagram illustrating the cell voltage management based on the I-V characteristic.

FIG. 10 shows an I-V characteristic map 804 obtained through corrections taking into account a margin 805 obtained by converting control delay time into a voltage value. When electrolysis is applied to water while the fuel gas is in shortage, the cell voltage decreases at a relatively rapid rate. Thus, even when the controller determines that the fuel gas is not in shortage after the cell voltage has dropped to a value within the tolerable range 803 and relatively close to the I-V characteristic map 802, if the fuel gas is actually in shortage, the cell voltage may thereafter decrease significantly below the I-V characteristic map 802 in a short time. The sharp reduction in cell voltage may increase the anode potential above the above-described threshold potential Van to ionize the platinum catalyst, contained in the catalyst layer of the membrane-electrode assembly 25. The possible control delay can be avoided by correcting the I-V characteristic map 802 taking into account the margin 805, obtained by converting the control delay time into the voltage value, and using the I-V characteristic map 804, obtained through the corrections, to determine whether or not the reaction gas is in shortage. The control delay time may be the duration of the various process (cell voltage sampling time, reaction gas shortage determination time, and the like) required for the cell voltage management, a mechanical delay time of responses from a control system, or the like FIG. 11 shows a simplified I-V characteristic map 806. The I-V characteristic map 806 is map data exhibiting a constant value V0 regardless of the cell current. The constant value V0 can be determined to be a cell voltage corresponding to a cell current=0 on the I-V characteristic map 802. By setting the highest voltage value V0 on the I-V characteristic map 802 to be a threshold voltage based on which whether or not the fuel gas is in shortage, whether or not the fuel gas is in shortage can be determined for the entire cell current range based on the voltage V0. Thus, the cell voltage management can be simplified. In this case, the voltage value V0 corresponding to each of the different temperatures may be pre-calculated so that the cell voltage can be managed based on the I-V characteristic map 806, for which the temperature characteristics are taken into account. Alternatively, voltage values based on which whether or not the fuel gas is in shortage may be pre-calculated for the entire temperature range assumed for the cell operation so that the voltage values obtained constitute the I-V characteristic map 806.

Figure 11:
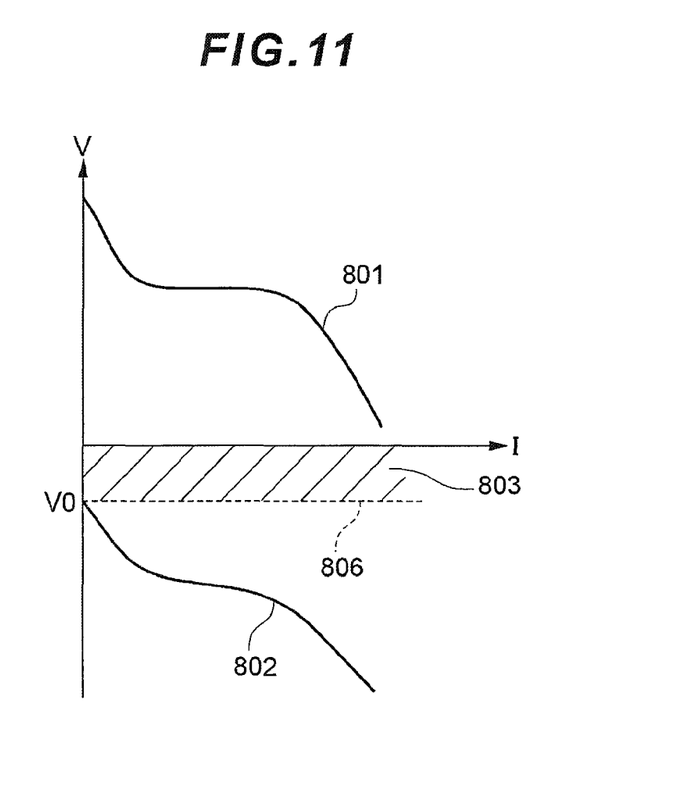
FIG. 11 is a diagram illustrating the cell voltage management based on the I-V characteristic.

The process of determining whether or not the fuel gas is in shortage using following is the same as the process of determining whether or not the fuel gas is in shortage using the I-V characteristic map 802 (FIG. 8): the I-V characteristic maps 802A, 802B, and 802C (FIG. 9), for which the temperature characteristics are taken into account, the I-V characteristic map 804 (FIG. 10), for which the control time delay is taken account, or the simplified I-V characteristic map 806 (FIG. 11). The I-V characteristic maps 802 (802A, 802B, and 802C), 804, and 806, shown in FIGS. 9 to 11, need not necessarily be used independently but may be used with any of the features of the I-V characteristic maps combined together.

According to the above-described cell voltage management based on the I-V characteristic map, the tolerable range 803 of the cell voltage within which the fuel gas is ensured not to be in shortage can be determined using the I-V characteristic maps 802, 804, and 806 with which the decrease in cell voltage is minimized during the electrolysis of water. When the fuel gas is determined not to be in shortage, the decrease in cell voltage can be allowed, eliminating the need for the output limitation. Therefore, possible degradation of drivability can be avoided.

In Embodiments 1 to 3, described above, the configuration in which the fuel cell system 10 is used as a vehicle-mounted power supply system is illustrated. However, the configuration of the fuel cell system 10 is not limited to this example. For example, the fuel cell system 10 may be mounted as a power source for any mobile object (a robot, a ship, an airplane, or the like) other than the fuel cell vehicle. Alternatively, the fuel cell system 10 may be used as a power generation facility (stationary power generation system) for a house, a building, or the like.

INDUSTRIAL APPLICABILITY

According to the present invention, the tolerable range of power generation can be flexibly changed by changing the lower voltage limit depending on the operation condition of the fuel cell. Furthermore, according to the present invention, the cell voltage can be properly managed according to the cell voltage reduction factor by determining whether the cell voltage reduction factor is the fuel gas shortage or the oxidation gas shortage.

The invention claimed is:

1. A fuel cell system comprising:
a fuel cell which receives a supply of a fuel gas and an oxidation gas to generate power;
a determination device programmed to determine whether or not an operation condition of the fuel cell corresponds to a fuel gas shortage or an oxidation gas shortage;
a lower voltage limit setting device programmed to set a lower voltage limit to a first limit when the determination device determines that the fuel gas is in shortage and set the lower voltage limit to a second limit when the determination device determines that the oxidation gas is in shortage, the first limit being higher than the second limit; and
a control device programmed to control an output voltage from the fuel cell so as to prevent the output voltage from decreasing below the lower voltage limit set by the lower voltage limit setting device.

2. A fuel cell system comprising:
a fuel cell which receives a supply of a fuel gas and an oxidation gas to generate power;
a lower voltage limit setting device programmed to set a lower voltage limit for a low-efficiency operation to be lower than that for a normal operation; and
a control device programmed to control an output voltage from the fuel cell so as to prevent the output voltage from decreasing below the lower voltage limit set by the lower voltage limit setting device.

3. The fuel cell system according to claim 2, wherein the control device is programmed to perform the low-efficiency operation when a refrigerant temperature is equal to or lower than a predetermined value at a time of the starting of the fuel cell system.

4. The fuel cell system according to claim 2, wherein the lower voltage limit setting device is programmed to set the lower voltage limit to be lower when the fuel gas is in shortage during the low-efficiency operation than when the fuel gas is in shortage during the normal operation.

5. The fuel cell system according to claim 1, wherein the lower voltage limit setting device is programmed to set the lower voltage limit to have a lower value as a temperature of the fuel cell decreases.

6. The fuel cell system according to claim 1, wherein when the output voltage from the fuel cell is lower than the lower voltage limit, the control device is programmed to carry out one of a process of an increasing amount of fuel gas or oxidation gas supplied to the fuel cell, a process of limiting an output current from the fuel cell, and a process of stopping power generation.

7. The fuel cell system according to claim 1, wherein in a transitive power generation condition with a variation in load, when a variation in the output voltage from the fuel cell is defined as $\Delta V$ and a variation in an output current from the fuel cell is defined as $\Delta I$, the determination device is programmed to calculate $|\Delta V/\Delta I|$, and when the $|\Delta V/\Delta I|$ is equal to or larger than a first threshold, to determine that the fuel gas is in shortage, and when the $|\Delta V/\Delta I|$ is smaller than the first threshold, the determination device is programmed to determine that the oxidation gas is in shortage.

8. The fuel cell system according to claim 1, wherein in a steady-state power generation condition with no variation in load, when a variation in the output voltage from the fuel cell is defined as $\Delta V$ and a temporal variation is defined as $\Delta t$, the determination device is programmed to calculate $|\Delta V/\Delta t|$, and when the $|\Delta V/\Delta t|$ is equal to or larger than a second threshold, to determine that the fuel gas is in shortage, and when the $|\Delta V/\Delta t|$ is smaller than the second threshold, the determination device is programmed to determine that the oxidation gas is in shortage.

9. The fuel cell system according to claim 1, wherein when an anode potential of the fuel cell is higher than a predetermined threshold voltage, the determination device is programmed to determine that the fuel gas is in shortage, and when the anode potential of the fuel cell is lower than the predetermined threshold voltage, the determination device is programmed to determine that the oxidation gas is in shortage.

10. The fuel cell system according to claim 1, wherein the determination device is programmed to calculate a cell voltage on a current-voltage characteristic map created under a condition which minimizes a decrease in an anode potential of the fuel cell during an electrolysis of water, and when an actual cell voltage is higher than the cell voltage on the current-voltage characteristic map, the determination device is programmed to determine that the fuel gas shortage is not occurring.

11. The fuel cell system according to claim 10, wherein the current-voltage characteristic map is map data with temperature characteristics.

12. The fuel cell system according to claim 10, wherein the current-voltage characteristic map is map data pre-corrected taking into account control delay time required to control the cell voltage.

13. The fuel cell system according to claim 10, wherein the current-voltage characteristic map is map data exhibiting a constant voltage value regardless of cell current.

* * * * *